(12) United States Patent
Cargnelli et al.

(10) Patent No.: US 7,077,187 B2
(45) Date of Patent: Jul. 18, 2006

(54) APPARATUS FOR EXCHANGING ENERGY AND/OR MASS

(75) Inventors: Joe Cargnelli, Toronto (CA); Jianming Ye, North York (CA); Xuesong Chen, Brampton (CA); Ravi B. Gopal, Toronto (CA)

(73) Assignee: Hydrogenics Corporation, Mississauga (CA)

( * ) Notice: Subject to any disclaimer, the term of this patent is extended or adjusted under 35 U.S.C. 154(b) by 532 days.

(21) Appl. No.: 09/941,934

(22) Filed: Aug. 30, 2001

(65) Prior Publication Data

US 2003/0042002 A1    Mar. 6, 2003

(51) Int. Cl.
F23L 15/02    (2006.01)
F24F 7/00    (2006.01)

(52) U.S. Cl. .................. 165/4; 165/10; 137/625.15

(58) Field of Classification Search ............ 165/4, 165/6, 8, 10, 7, 66, 98, 99, 101; 137/625, 137/625.11, 625.15, 311, 625.12; 431/215, 431/11; 432/180, 181; 62/271
See application file for complete search history.

(56) References Cited

U.S. PATENT DOCUMENTS

| | | | |
|---|---|---|---|
| 1,858,508 A * | 5/1932 | Kignell et al. ............. | 165/4 |
| 2,204,431 A | 6/1940 | Moore et al. | |
| 4,093,435 A | 6/1978 | Marron et al. | |
| 4,269,611 A | 5/1981 | Anderberg | |
| 4,280,416 A * | 7/1981 | Edgerton .................. | 110/254 |
| 4,753,286 A * | 6/1988 | Herbst .................... | 165/46 |
| 4,856,577 A * | 8/1989 | Katsu et al. ............... | 165/8 |
| 4,924,934 A | 5/1990 | Steele | |
| 5,515,909 A * | 5/1996 | Tanaka ..................... | 165/4 |
| 5,702,508 A * | 12/1997 | Moratalla .................. | 96/118 |
| 5,848,885 A * | 12/1998 | Tanaka et al. ............. | 431/215 |
| 5,983,986 A * | 11/1999 | Macintyre et al. .......... | 165/9 |
| 6,155,334 A | 12/2000 | Steele | |
| 6,298,877 B1 * | 10/2001 | Inuki et al. ............ | 137/625.11 |
| 2002/0050145 A1 * | 5/2002 | Dunham .................... | 62/271 |

FOREIGN PATENT DOCUMENTS

| | | |
|---|---|---|
| DE | 25 12 065 | 9/1976 |
| EP | 0 279 495 | 8/1968 |
| EP | 0 512 534 | 11/1992 |
| EP | 0 853 967 | 7/1998 |
| FI | 100133 B * | 9/1997 |
| GB | 508 372 | 6/1939 |
| GB | 942 261 | 11/1963 |

* cited by examiner

*Primary Examiner*—Tho Duong
(74) *Attorney, Agent, or Firm*—Bereskin & Parr

(57) ABSTRACT

A regenerative energy and/or mass exchange assembly has: an exchange media; a first flow path to pass a fluid stream through the exchange media; at least a second flow path to pass a further fluid stream through the exchange media; and at least one fluid stream diverter to divert the different flow paths to pass the respective fluid streams through different regions of the exchange media. A method for operating the regenerative assembly is also provided.

21 Claims, 15 Drawing Sheets

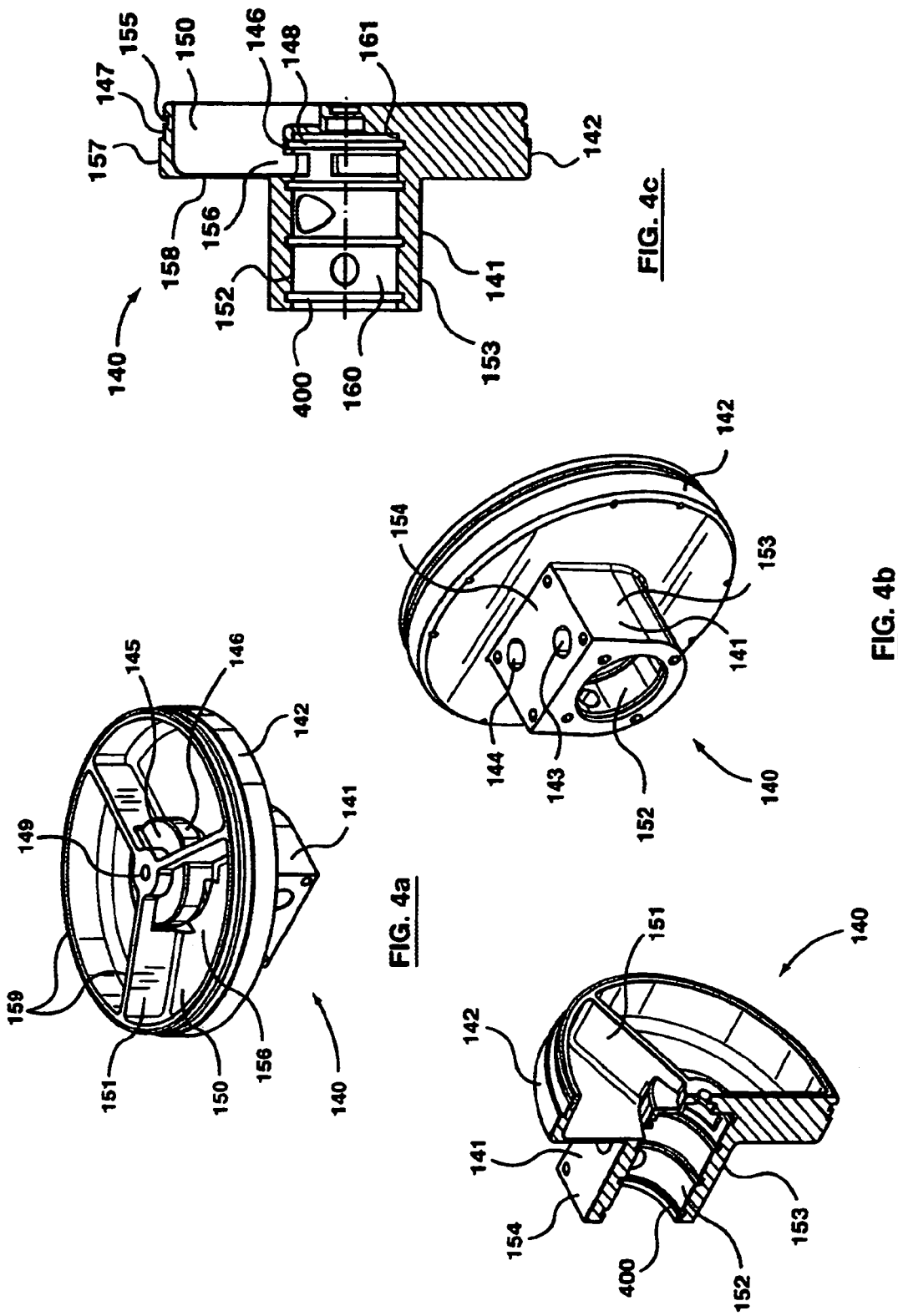

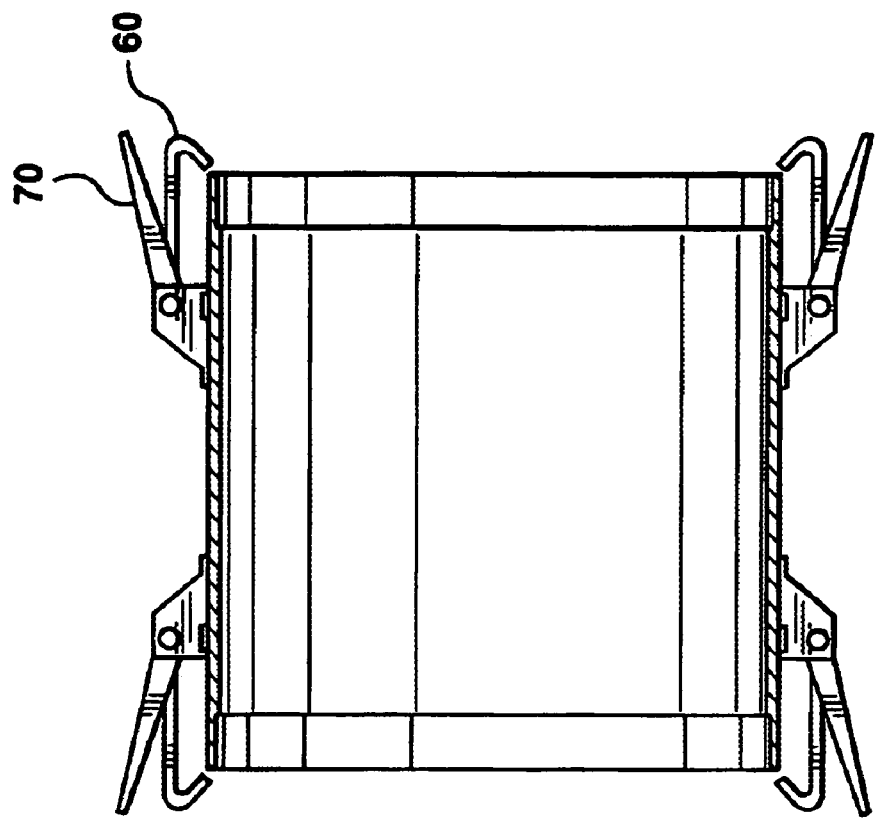
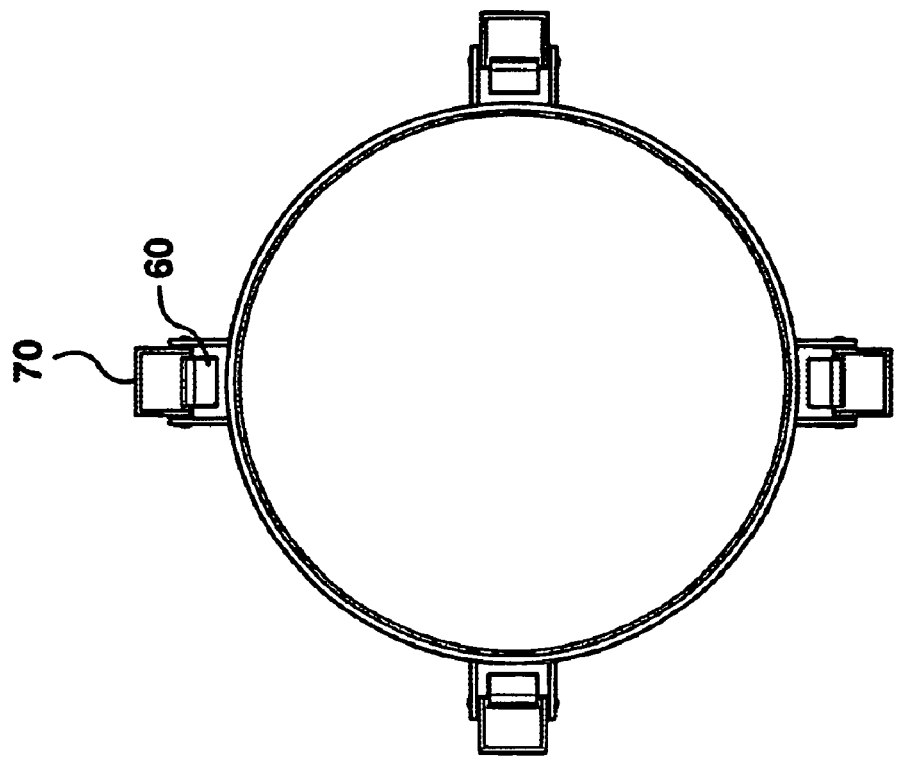
FIG. 9b
FIG. 9a

APPARATUS FOR EXCHANGING ENERGY AND/OR MASS

FIELD OF THE INVENTION

The present invention relates generally to a method and apparatus for exchanging energy and mass between at least two fluid streams.

BACKGROUND OF THE INVENTION

A conventional regenerative device that exchanges sensible heat, latent heat, and moisture between two streams of fluids can be manufactured in the form of a wheel, and can be referred to as an enthalpy wheel, an energy wheel, or a heat exchange wheel (hereinafter 'enthalpy wheel'). Conventional enthalpy wheels are illustrated in U.S. Pat. Nos. 4,093,435, 4,924,934 and 6,155,334.

A conventional enthalpy wheel typically rotates on a shaft at fairly low speeds, for example, no more than about 40 r.p.m. The enthalpy wheel typically has a housing containing a matrix of media (capable of absorbing sensible heat) that is coated with a desiccant material (capable of absorbing moisture and thus latent as well as sensible heat). The media can be made of alternate sheets of flat and corrugated paper whose open-ended corrugations provide a multitude of parallel passages through the wheel in an axial direction. This arrangement of the corrugations facilitates the flow of fluids through the enthalpy wheel. The housing together with the media is generally rotated about the shaft by, for example, a motor.

Two fluid streams, for example, a first humidified and heated air stream and a second dry and cool air stream, can enter the enthalpy wheel along the axial direction. The first air stream flows through the enthalpy wheel from one side into an area of the media where the humidity and heat in the air stream is absorbed and retained by the media. The second air stream flows through the enthalpy wheel, generally through the opposite side from the first air stream, and into an area of the media that is usually in symmetrical relation to the area where the first stream entered the housing. As the enthalpy wheel rotates about its axis, the area of the media that has retained and absorbed the humidity and heat from the first air stream rotates to where the second air stream flows through the housing to transfer humidity and heat to the dry cool air of the second stream.

SUMMARY OF THE INVENTION

In accordance with the present invention there is provided a regenerative energy and/or mass exchange assembly comprising an exchange media, a first flow path to pass a fluid stream through the exchange media, at least a second flow path to pass a further fluid stream through the exchange media, and at least one fluid stream diverter to divert the different flow paths to pass the respective fluid streams through different regions of the exchange media.

In one embodiment, the exchange assembly further comprises at least one housing connected to one end of the exchange media and wherein the flow paths are provided in the housing.

In another embodiment, the fluid stream diverter is provided in the housing.

In another embodiment, the housing and the fluid stream diverter cooperate to form the flow paths.

In another embodiment, the fluid stream diverter is rotatably mounted within the housing.

In another embodiment, the exchange media is housed in a plurality of cavities that are separated from one another in cross section and extend in parallel along the direction of fluid stream flow.

In another embodiment, the fluid stream diverter rotates to pass the different fluid streams through the exchange media.

In another embodiment, the fluid stream diverter rotates to pass the different fluid streams through different cavities of the exchange media.

In another embodiment, the exchange assembly further comprises a shaft that extends through the exchange media, the at least one housing connected to one end of the exchange media, and the fluid stream diverter rotatably mounted within the housing.

In another embodiment, the fluid stream diverter has a radial extent that is generally less than the radial extent of the exchange media.

In another embodiment, the at least one housing connected to one end of the exchange media comprises a connection portion and a dispersion portion which are in fluid communication with each other.

In another embodiment, the connection portion has at least two ports adapted to connect to external fluid stream sources.

In another embodiment, the dispersion portion has an open end that is in fluid communication with the exchange media.

In another embodiment, the connection portion has a radial extent that is generally less than the radial extent of the dispersion portion.

In another embodiment, the fluid stream diverter is substantially disposed within the connection portion.

In another embodiment, the fluid stream diverter has a radial extent that is substantially equal to the radial extent of an inner wall of the connection portion.

In another embodiment, the dispersion portion comprises a plurality of chambers that are separated from one another.

In another embodiment, the plurality of cavities that house the exchange media are disposed within a central housing.

In another embodiment, each cavity is thermally insulated from adjacent cavities.

In another embodiment, the plurality of cavities that house the exchange media are positioned in correspondence to the chambers of the dispersion portion.

In another embodiment, the cavities and the chambers are substantially equal in cross section and substantially evenly spaced about the axial direction.

In another embodiment, the number of chambers is three, and the number of cavities is three.

In another embodiment, the number of chambers is five, and the number of cavities is five.

In another embodiment, the fluid stream diverter comprises in sequence along the axial direction a first segment, a first reduced diameter portion, a second segment, a second reduced diameter portion, and a third segment; an inner bore defining an inner space within the fluid stream diverter; a first passage extending from a first port in the outer wall of the second reduced diameter portion through the inner space and then to a second port on the outer wall of the first segment; a second passage extending from a third port on the end wall of the first segment adjacent to the first reduced diameter portion to a fourth port on the outer wall of the first segment; and wherein the said first and second passages are isolated from each other.

In another embodiment, a sealing means is provided between the fluid stream diverter and the connection portion.

In another embodiment, the sealing means is provided between each of the first, second, and third segment, of the fluid stream diverter and the inner wall of the connection portion.

In another embodiment, the connection portion has an open end and a closing means which closes the open end.

In another embodiment, the exchange assembly further comprises snap-connection means provided between the central housing and the housing connected to one end of the exchange media.

In another embodiment, the assembly has a first end housing and a second end housing disposed on either end of the exchange media.

In another embodiment, a first fluid stream diverter is disposed in the first end housing and a second fluid stream diverter is disposed within the second end housing.

In another embodiment, the plurality of chambers of the dispersion portion of the first end housing is in substantial axial alignment with the corresponding plurality of chambers of the dispersion portion of the second end housing.

In another embodiment, the first and second fluid stream diverters are disposed correspondingly in the respective end housings and rotate in phase during operation.

In accordance with the present invention, there is provided a method of exchanging energy and/or mass between at least two fluid streams, the method comprising:
(a) passing at least two fluid streams through different regions of an exchange media; and
(b) changing the flow paths of the fluid streams to the exchange media so that at least one of the fluid streams is passed through a region of the exchange media that a different fluid stream had passed through.

In one embodiment, each flow path is changed by a fluid stream diverter.

In another embodiment, the fluid stream diverter is provided in a housing connected to one end of the exchange media.

In another embodiment, the housing and the fluid stream diverter cooperate to form the flow paths.

In another embodiment, the fluid stream diverter is rotatably mounted within the housing.

In another embodiment, the exchange media is housed in a plurality of cavities that are separated from one another in cross section and extend in parallel along the direction of fluid stream flow.

In another embodiment, the fluid stream diverter rotates to pass the different fluid streams through the exchange media.

In another embodiment, the fluid stream diverter rotates to pass the different fluid streams through different cavities of the exchange media.

In another embodiment, step (a) includes passing the fluid streams through different regions of an exchange media in a concurrent direction.

In another embodiment, step (a) includes passing the fluid streams through different regions of an exchange media in a counter-current direction.

BRIEF DESCRIPTION OF THE DRAWING FIGURES

For a better understanding of the present invention, and to show more clearly how it may be carried into effect, reference will now be made, by way of example, to the accompanying drawings, which show a preferred embodiment of the present invention in which:

FIG. 3b shows a longitudinal sectional view of a central housing according to the present invention taken along the lines A—A of FIG. 3a;

FIG. 4a shows a perspective view of a first example of an end housing according to the present invention;

FIG. 4b shows another perspective view of a first example of an end housing according to the present invention;

FIG. 4c shows a longitudinal sectional view of a first example of an end housing according to the present invention;

FIG. 4d shows a perspective sectional view of a first example of an end housing according to the present invention;

FIG. 9a shows a plan view of a central housing according to the present invention with snap connection means provided thereon;

FIG. 9b shows a side elevational view of a central housing according to the present invention with snap connection means provided thereon;

DETAILED DESCRIPTION OF THE PREFERRED EMBODIMENT

Figure 1A:
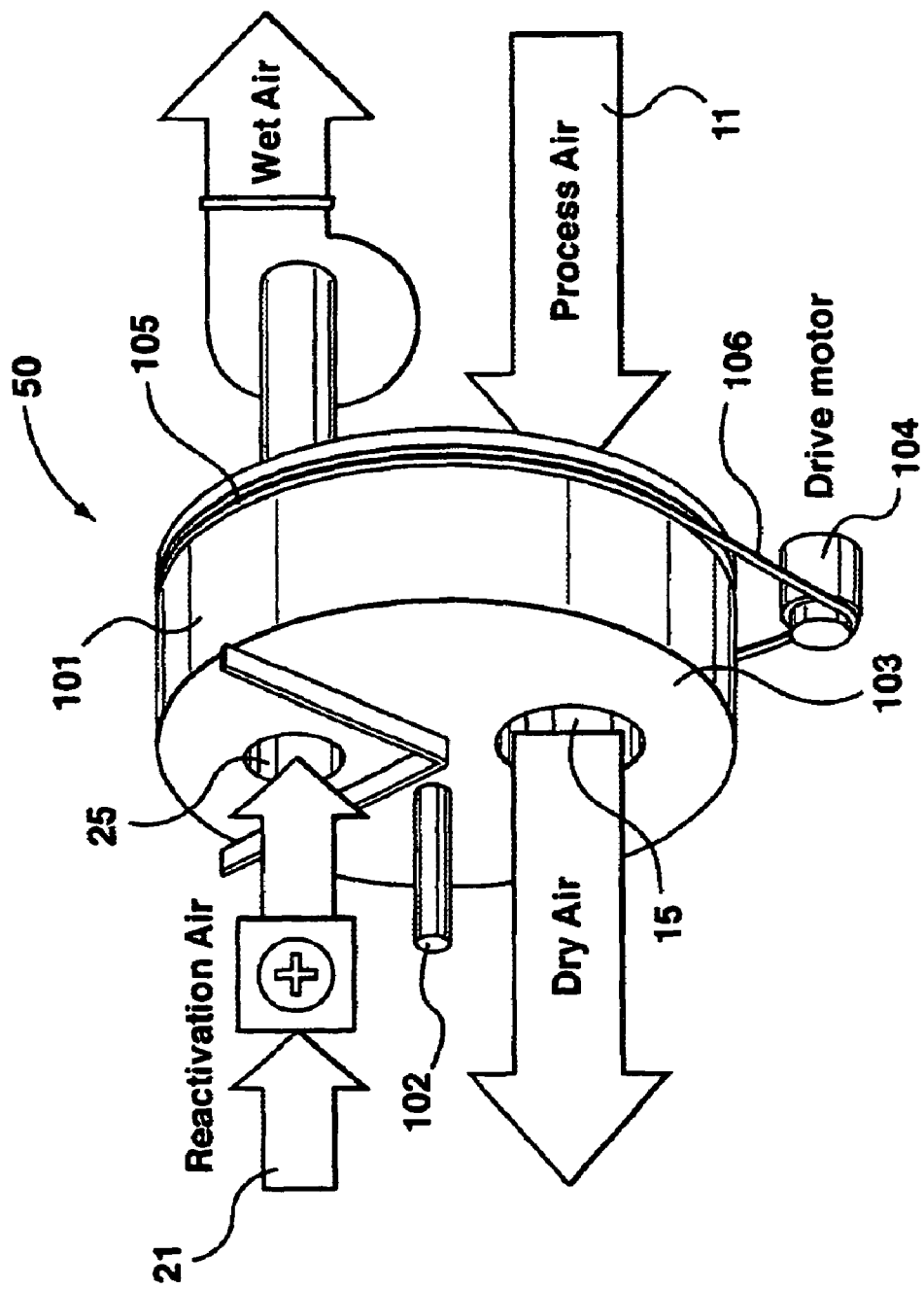
FIG. 1a shows a perspective view of a conventional enthalpy wheel.
Figure 1B:
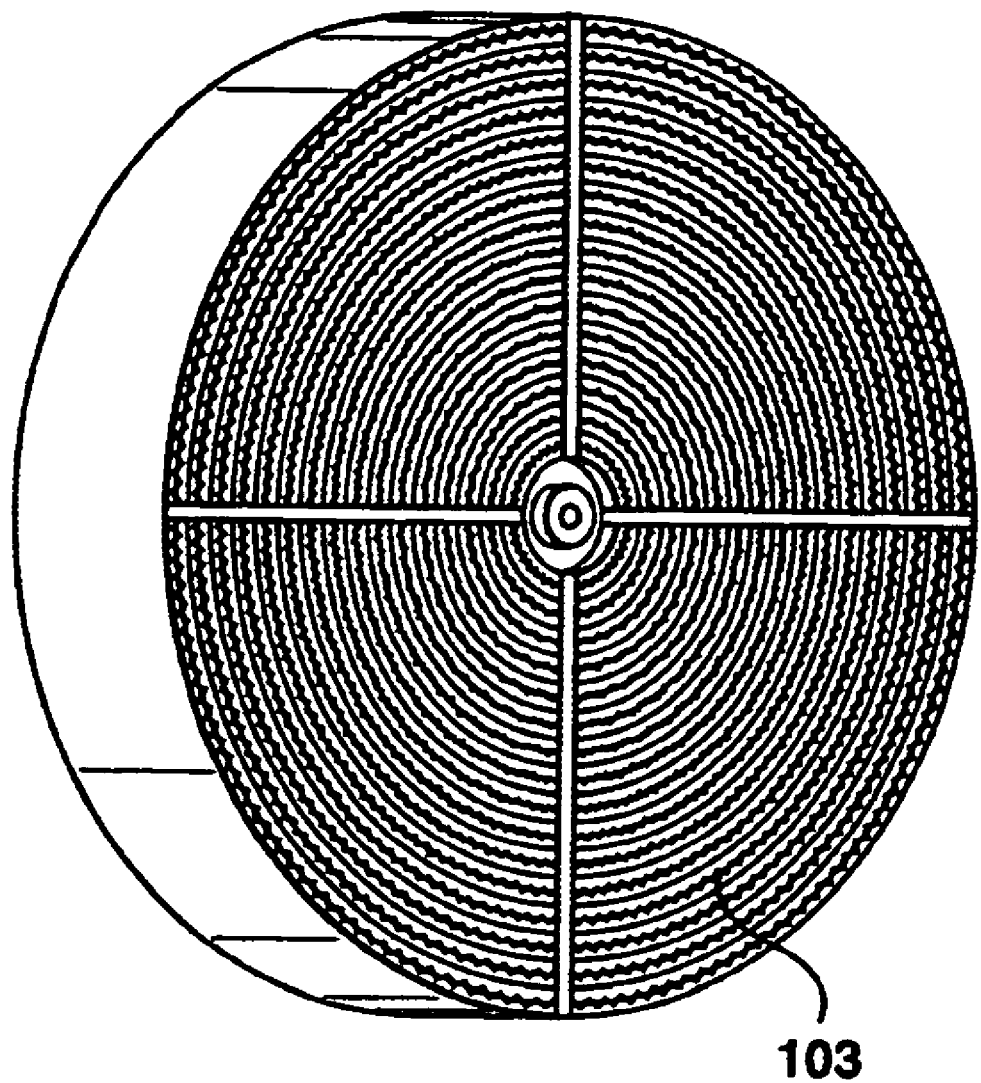
FIG. 1b shows a perspective view of an exchange media used in a conventional enthalpy wheel.

A conventional enthalpy wheel 50 is illustrated in FIG. 1a. Enthalpy wheel 50 rotates on a shaft 102, at fairly low speeds, for example, no more than about 40 r.p.m. The enthalpy wheel 50 typically has a housing 101 containing a matrix of media 103 (capable of absorbing sensible heat) that is coated with a desiccant material (capable of absorbing moisture and thus latent as well as sensible heat). As shown in FIG. 1b, the media 103 can be made of alternate sheets of flat and corrugated paper whose open-ended corrugations provide a multitude of parallel passages through the wheel in an axial direction. This arrangement of the corrugations facilitates the flow of fluids through the enthalpy wheel 50. The housing 101 together with the media 103 is generally rotated about the shaft 102 by, for example, a motor 104. A groove 105 can be provided on the circumference of the housing 101 so that a belt 106 can be placed within the groove 105 to transmit the driving force from the motor 104 to rotate the housing 101 of the enthalpy wheel 50. A cassette housing (not shown) can enclose the enthalpy wheel 50, and be fluidly connected to gas ducts (not shown).

Two fluid streams, for example, a first humidified and heated air stream 11 and a second dry and cool air stream 21, can enter the enthalpy wheel 50 along the axial direction. The first air stream 11 flows through the enthalpy wheel 50 from one side into an area of the media 103—indicated at 15—where the humidity and heat in the first air stream 11 is absorbed and retained by the media 103. The second air stream 21 flows through the enthalpy wheel 50, generally through the opposite side from the first air stream 11, and into an area of the media 103—indicated at 25—that is usually in symmetrical relation to the area where the first stream 11 entered the media 103. As the housing 101 of the enthalpy wheel 50 rotates about its axis, the area of the media 103 that has retained and absorbed the humidity and heat from the first air stream 11 rotates to where the second air stream 21 flows through the media 103 transferring humidity and heat to the dry cool air of the second stream 21.

Figure 2A:
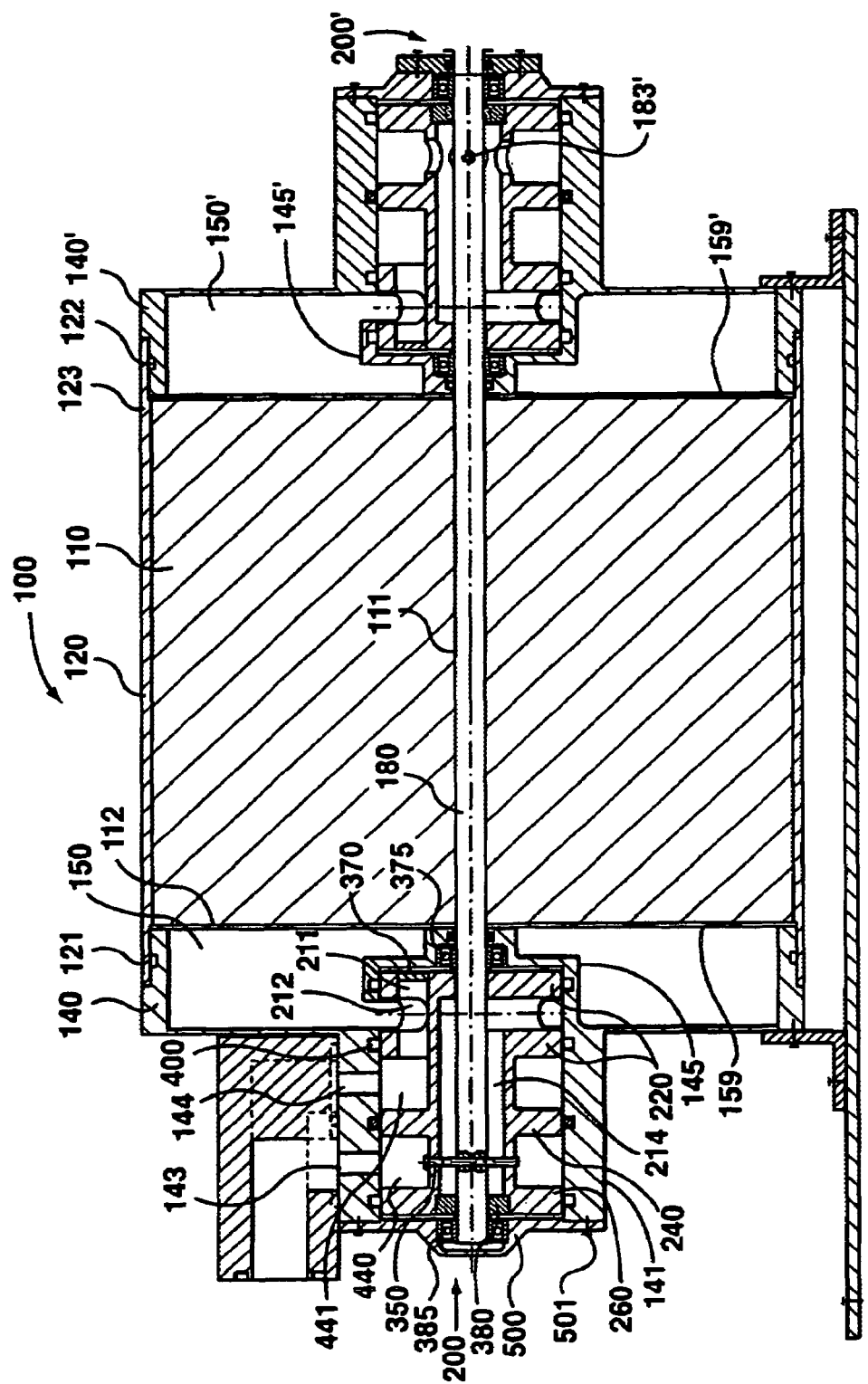
FIG. 2a shows a longitudinal sectional view of an enthalpy wheel assembly according to the present invention.

FIG. 2a shows a longitudinal sectional view of an enthalpy wheel assembly 100 of the present invention. By way of example, the embodiment disclosed will refer to an exchange of heat and humidity between two gas streams such as, for example, in a ventilation or air conditioning system. However, it is understood that the enthalpy wheel 100 can be used to exchange energy and/or mass between more than two fluid streams. More specifically, the enthalpy wheel assembly 100 might also have applicability to other uses, such as, but are not limited to, gas purification, gas enrichment, valuable component recovery from gas mixtures, and selective mass transfer between two gas streams.

Referring to FIG. 2a, the enthalpy wheel assembly 100 comprises a central housing 120, a first end housing 140 and a second end housing 140'. For the embodiment illustrated in FIG. 2a, the components in the first end housing 140 are identical to those in the second end housing 140'. Accordingly, the numbers relating to the second end housing 140' are denoted with a suffix '. The central housing 120 is preferably cylindrical in shape and contains an exchange media 110. A suitable exchange media comprises random oriented fiber based carbon paper commercially available from E-TEK, or carbon cloth commercially available from W. L. Gore. The media 110 has two end surfaces 112, 112'. The two end housings 140, 140' are placed at the opposite open ends of the central housing 120. A shaft 180 extends throughout the three housings 120, 140, 140', preferably along the center of the annular section of those housings. Further, a fluid stream diverter 200 is fitted into the first end housing 140 about shaft 180, as will hereinafter be described. Furthermore, the fluid stream diverter 200 and the end housing 140 in the embodiment disclosed cooperate with one another to form at least two flow paths to the exchange media 110 for the external gas streams. Moreover, the second end housing 140' can also be provided with a fluid stream diverter 200'.

Figure 3B:
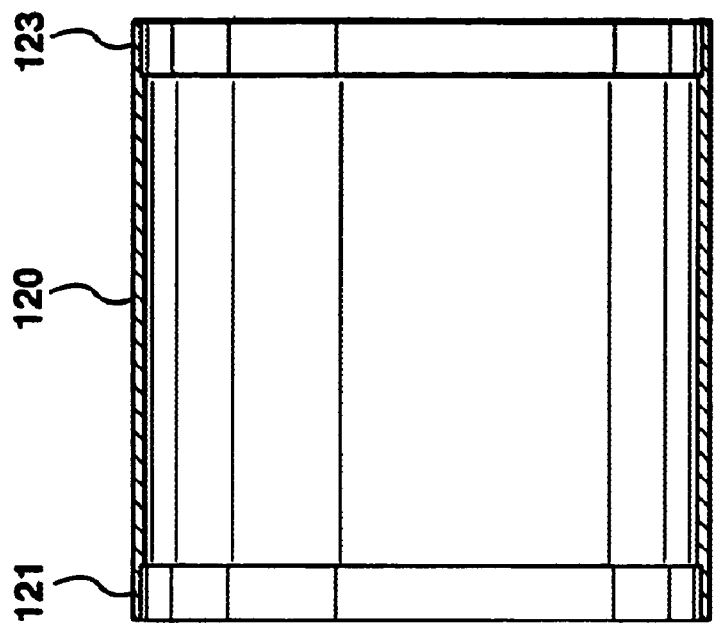
Figure 3A:
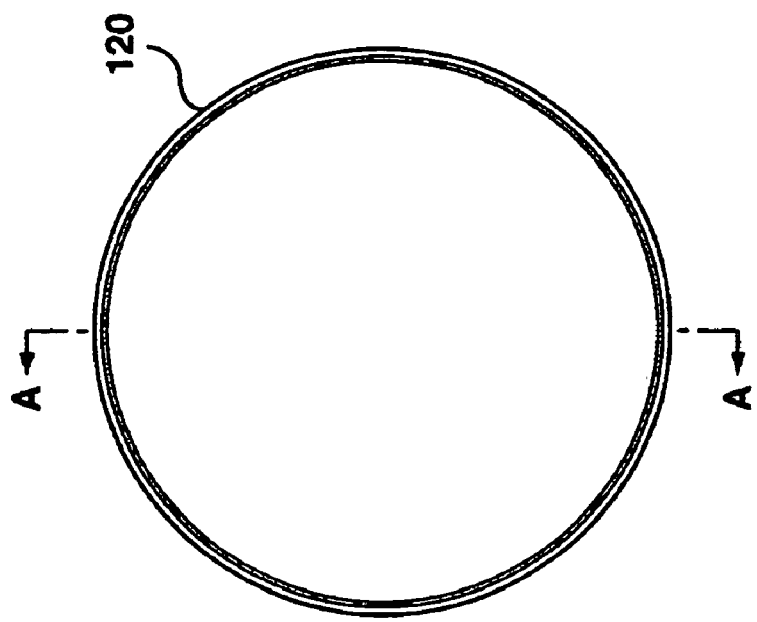
FIG. 3a shows a plan view of a central housing accordingly to the present invention.

As shown in FIGS. 3a and 3b, the central housing 120 of the enthalpy wheel assembly 100 has enlarged inner diameter portions 121 and 123 at each end thereof. The enlarged diameter portions 121 and 123 are adapted to connect the first and second end housings 140, 140' to the central housing 120.

FIGS. 4a–4d show various perspective and sectional views of a first example of an end housing. It is understood that although the numbers in FIG. 4 correspond to the first end housing 140, they are equally applicable to the second end housing 140'.

Referring to FIG. 4a, the first end housing 140 has a connection portion 141 and a dispersion portion 142, which are in fluid communication with each other. The connection portion 141 has an outer wall 153 and an inner wall 152. Inner wall 152 defines an inner enclosure or inner chamber 160 (also called inner space 160) that can be cylindrical in shape. The outer wall 153 of the connection portion 141 can define a plane portion 154 having two gas ports 143, 144 provided thereon. The gas ports 143, 144 are in fluid communication with the inner chamber 160 of the connection portion 141. The open end of the connection portion 141 is closeable by a closing means 500 (see FIG. 2a), such as a threaded cap or the like. Referring to FIG. 4d a number of annular grooves 400 are provided in parallel relation on the inner wall 152 of the connection portion 141, to accommodate a sealing means, such as an O-ring (not illustrated).

FIGS. 4a and 4b show an end wall 158 of the dispersion portion 142 extending radially from the connection portion 141, and a portion 157 extending axially from end wall 158. The axially extending portion 157 can be cylindrical in shape and have a reduced outer diameter portion 147 adapted to fit into the enlarged inner diameter portion 121 of the central housing 120 as shown in FIG. 2a. An O-ring groove 155 can be provided on the reduced diameter portion 147 for sealing between the central housing 120 and the first end housing 140.

A journal 145 is provided at the center of the open end of the dispersion portion 142. A plurality of chamber dividers 151 extends radially from the journal 145 towards the outer wall of the dispersion portion 142 to define a plurality of chambers 150. The journal 145 has a portion 146 that extends axially towards the connection portion 141. Further, portion 146 is spaced from the inner end wall 158 of the dispersion portion 142 forming a plurality of partially circular openings 156 within each chamber 150 of the dispersion portion 142. Openings 156 provide a plurality of gas flow paths into the plurality of chambers 150 from the inner chamber 160 of connection portion 141. The journal 145 has a hub 149 that supports the shaft 180.

At least one annular groove 148 can be provided on an inner wall 161 of the axially extending portion 146 for sealing, for example, by using an O-ring (not illustrated). The inner wall 161 of the axially extending portion 146 can have roughly the same diameter as the inner chamber 160 of the connection portion 141. The dispersion portion 142 and the journal 145 have a common end face 159.

Figure 5B:
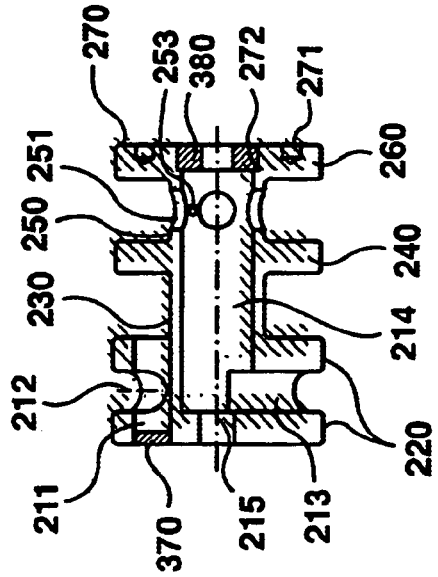
FIG. 5b shows a longitudinal sectional view of a fluid stream diverter according to the present invention.
Figure 5A:
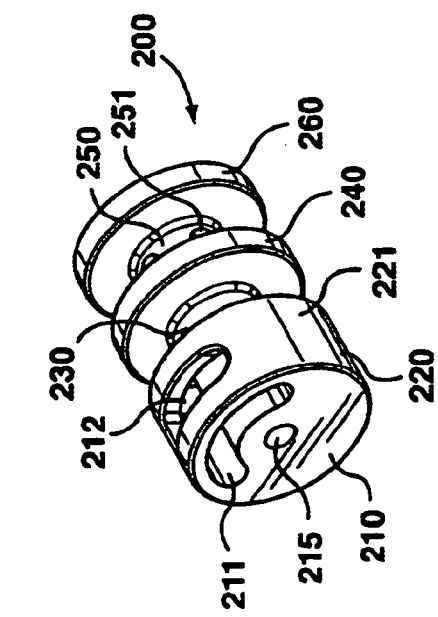
FIG. 5a shows a perspective view of a fluid stream diverter according to the present invention.
Figure 5D:
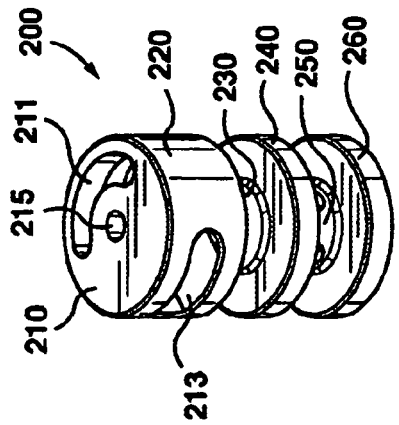
FIG. 5d shows another perspective view of a fluid stream diverter according to the present invention.
Figure 5C:
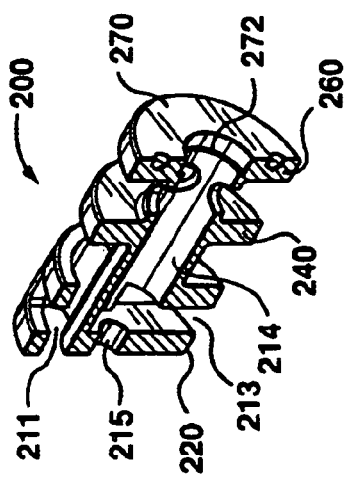
FIG. 5c shows a perspective sectional view of a fluid stream diverter according to the present invention.

FIG. 2a shows the fluid stream diverter 200 fitted into the first end housing 140. FIGS. 5a, 5b, and 5c show the detailed structure of the fluid stream diverter 200. The fluid stream diverter 200 has a plurality of reduced diameter portions. Specifically, in the preferred embodiment, the fluid stream diverter 200 has a first segment 220, a second segment 240, and a third segment 260, as well as a first reduced diameter portion 230 and a second reduced diameter portion 250. The segments 220, 240 and 260 can have the same diameter. Likewise, the reduced diameter portions 230, 250 can have the same reduced diameter. Within an end surface 210 of the fluid stream diverter 200 a slot 211 is provided. Preferably, slot 211 is arc shaped, and has a smaller radius than the end surface 210 of the first segment 220. The slot 211 extends axially throughout the first segment 220. On the outer wall 221 of the first segment 220 two slots can be provided, namely slots 212 and 213. Slot 211 is in fluid communication with slot 212.

The fluid stream diverter 200 has an inner bore 214 extending axially throughout the length thereof. The inner bore 214 extends to a position adjacent to the end surface 210, at which point it has a reduced diameter portion 215 for supporting the shaft 180. The inner bore 214 is isolated from slots 211 and 212. Slot 213 is in fluid communication with inner bore 214.

Figure 2B:
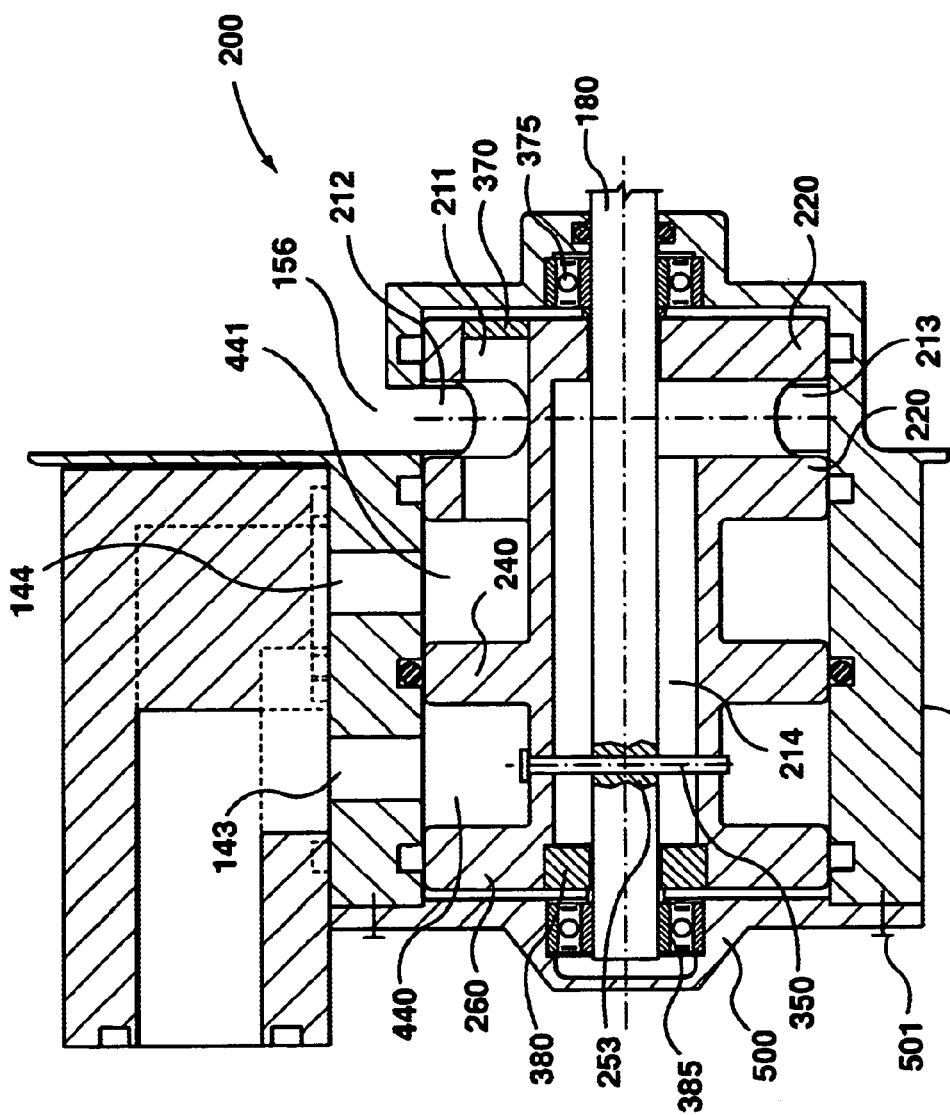
FIG. 2b shows an enlarged view of one end of an enthalpy wheel assembly according to the present invention.

The second reduced diameter portion 250 is provided with a plurality of holes that penetrate this portion, namely, a plurality of gas dispersion holes 251 and pinholes 253. As shown in FIG. 2b, at least one of the pinholes 253 can be used to accommodate a pin 350 to fix the fluid stream diverter 200 to the shaft 180 so that the fluid stream diverter 200 rotates with the shaft to disperse the gas streams, as will hereinafter be described.

On an end surface 270 of the third segment 260, a number of screw holes 271 are provided. These screw holes 271 are used to accommodate screws to enable the fluid stream diverter 200 to be removed from the first end housing 140 when the enthalpy wheel 100 is disassembled. Fluid stream diverters 200 and 200' are respectively fitted into the inner spaces 160, 160' of the first and second end housings 140 and 140'. The shaft 180 passes through the respective reduced diameter portions 215, 215' of the fluid stream diverters 200 and 200' and the fluid stream diverters are fixed to the shaft 180 using respective pins 350, 350'. During operation, the fluid stream diverters 200, 200' are continuously rotating with the shaft 180.

Referring to FIG. 2a, a heat and mass exchange media 110 is disposed within the central housing 120. The media has an inner hole 111 extending axially therethrough to rotatably receive the shaft 180. In operation, the shaft is driven by a motor (not shown). This arrangement allows the fluid stream diverters 200 and 200' within the first and second end housings 140 and 140' to rotate in phase with the shaft 180 without turning the media 110 therein. As described above, each of the first and second end housings 140 and 140' has a reduced diameter portion 147 adapted to fit into the enlarged diameter portion 121, 123 of the central housing 120. Preferably, sealing means 122, for example O-rings, are provided to prevent leakage of any gas from the gas streams. Preferably, the media 110 and the first and second end housings 140 and 140' are dimensioned such that the end surfaces 159, 159' of the journals 145, 145' are adjacent to, but not in contact with, the end surfaces 112, 112' of the media, as shown in FIG. 2a.

Figure 6:
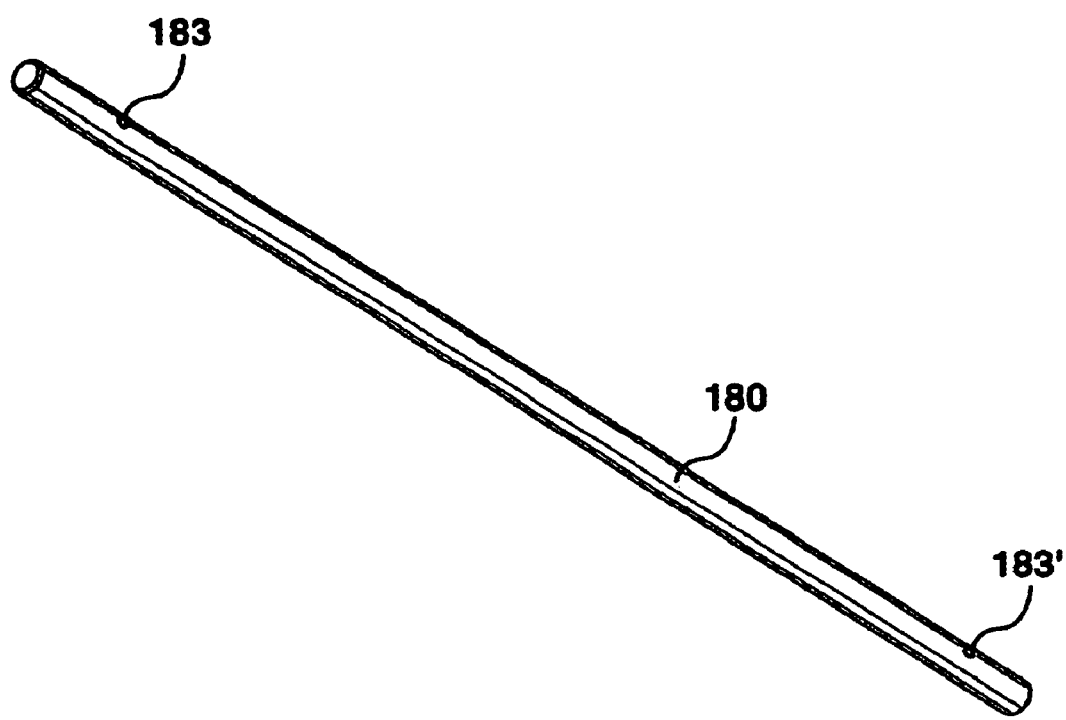
FIG. 6 shows a perspective view of a shaft according to the present invention.

Shaft 180 (see FIG. 6) is provided with pinholes 183 and 183'. As can be seen on the left side of FIG. 2a, the fluid stream diverter 200 is fixed with respect to the shaft by means of a pin 350 that fits into the pinhole 253 of the fluid stream diverter 200 and one of the pinholes 183 and 183' on the shaft 180. Therefore, the fluid stream diverter 200 rotates in the same phase as the shaft 180.

As the diameter of the inner bore 214 of the fluid stream diverter is greater than the outer diameter of the shaft 180, a gas flow path is formed within the fluid stream diverter 200. The inner chamber 160 of the connection portion 141 preferably has substantially the same diameter as that of the outer wall 221 of the fluid stream diverter 200, which, as seen in FIGS. 5a and 5b is the diameter of the first, second and the third segments 220, 240, 260. The fluid stream diverter 200 is positioned within the first housing 140 on the shaft 180 such that the second segment 240 of the fluid stream diverter 200 is in substantial alignment with a groove 400 provided on the inner wall 152 of the connection portion 141 in which, for example, an O-ring (not illustrated) can be placed to provide a seal. With fluid stream diverter 200 positioned within first end housing 140 as illustrated in FIG. 2b, a first inner space 440 between the second segment 240 and third segment 260 is provided that is separated from a second inner space 441 between the first segment 220 and the second segment 240. Moreover, the third segment 260 can be provided with an O-ring (not illustrated).

Now referring to FIGS. 5a, 5b and 5c, the first end housing 140 and the fluid stream diverter 200 are dimensioned such that each of the slots 212, 213 of the first segment 220 of the fluid stream diverter 200 are substantially in alignment with each of the plurality of openings 156 located in the plurality of chambers 150 for dispersing gases when the fluid stream diverter 200 is disposed in the first end housing 140. Preferably, the journal 145 is provided with at least one groove 148. Since the diameter of the inner wall 161 of the journal 145 is substantially the same as that of the inner wall 152 of the connection portion 141, it is substantially the same as the diameter of the outer wall 221 of the first segment 220 of the fluid stream diverter 200. Sealing means, for example an O-ring (not illustrated), can be placed in the groove 148 to provide sealing between the journal 145 and the first segment 220. When in assembly, two separate plates are provided for the fluid stream diverter 200, namely, a sealing plate 370 and a support plate 380 (see FIGS. 2a and 2b). As can best be seen in FIG. 5b, the sealing plate 370 is formed in accordance with the shape of the slot 211 of the first segment 220 and has a certain thickness so that it can fit into the slot 211 and close the slot 211 on the end surface 210. Sealing plate 370 can be fixed onto the fluid stream diverter 200 by means of, for example, welding or the like. The support plate 380 is provided with a through hole so that the shaft 180 can pass through it. The support plate 380 has a diameter that is greater than the diameter of the inner bore 214 of the fluid stream diverter 200. The internal bore 214 of the fluid stream diverter 200 is provided with a step 272 at a position adjacent the end face 270 so that the support plate 380 can fit into the inner bore 214 of the fluid stream diverter 200 and abut against the step 272. Therefore, the fluid stream diverter 200 is supported about the shaft 180 at two positions adjacent to the ends thereof, i.e., by reduced diameter portion 215 and by support plate 380.

Still referring to FIGS. 2a and 2b, a closing means 500, such as a cap, is provided on the end surface of the connection portion 141 of the first end housing 140. The closing means 500 is fixed onto the end surface of the connection portion 141 in a known manner, such as, for example, a screw connection as illustrated at 501. The closing means 500 supports the shaft 180 by means of a bearing 385. The shaft is also supported by the journal 145 by means of a bearing 375. Sealing between the journal 145 and the shaft 180 can be provided by, for example, an O-ring. Therefore, the shaft 180 is supported by the first end housing 140 in two locations using bearings.

Figure 10:
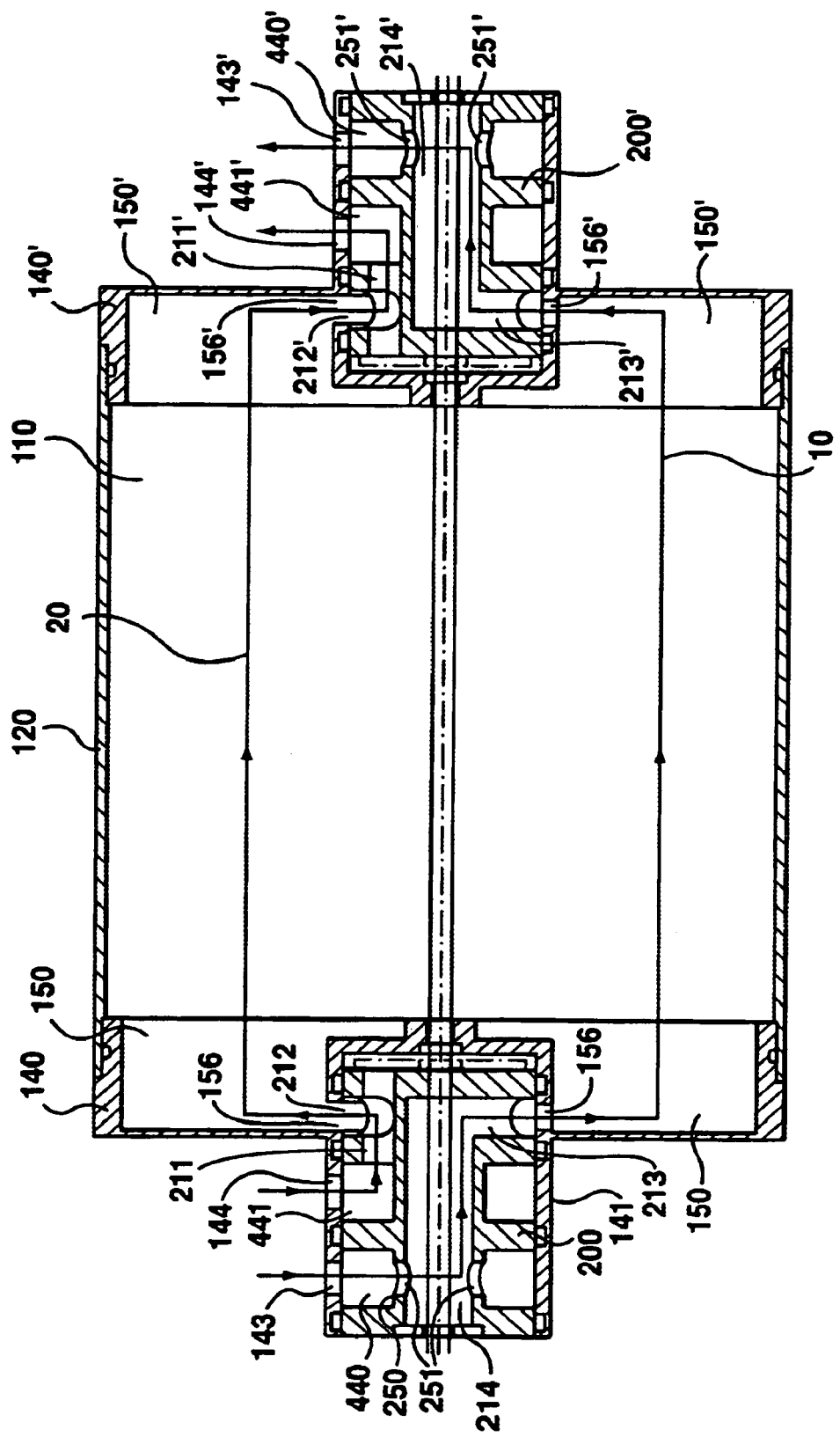
FIG. 10 shows another longitudinal sectional view of an enthalpy wheel assembly according to the present invention.

As shown in FIG. 4b two gas ports 143 and 144 are provided on the plane portion 154 of the connection portion 141 of the first end housing 140. As seen in FIG. 10, the two gas ports 143 and 144 are in fluid communication with the inner chamber 160 of the connection portion 141. In the radial direction of flow, the gas port 143 is in fluid communication with the following components: the first inner space 440, the plurality of gas dispersion holes 251, the inner bore 214, the slot 213, and, with appropriate rotation of the fluid stream diverter 200, as will hereinafter be described, the plurality of openings 156, the plurality of chambers 150, and the central housing 120. The gas port 144 is in fluid communication with the following components: the second inner space 441, the slot 211, the slot 212, and, with appropriate rotation of the fluid stream diverter 200, as will hereinafter be described, the plurality of openings 156, the plurality of chambers 150, and the central housing 120. In the same manner, the central housing 120 is in fluid communication with the second end housing 140'.

The first and second end housings 140, 140' are positioned such that the plurality of chambers 150 of the first end housing 140 are generally in alignment with the chambers 150' of the second end housing 140'. Additionally, the fluid stream diverters 200 and 200' turn in phase with each other while the enthalpy wheel assembly 100 is in operation. That is to say, the positions of the slots 211, 212, 213 are constantly in alignment with those of the slots 211', 212', 213' in the axial direction.

Figure 7B:
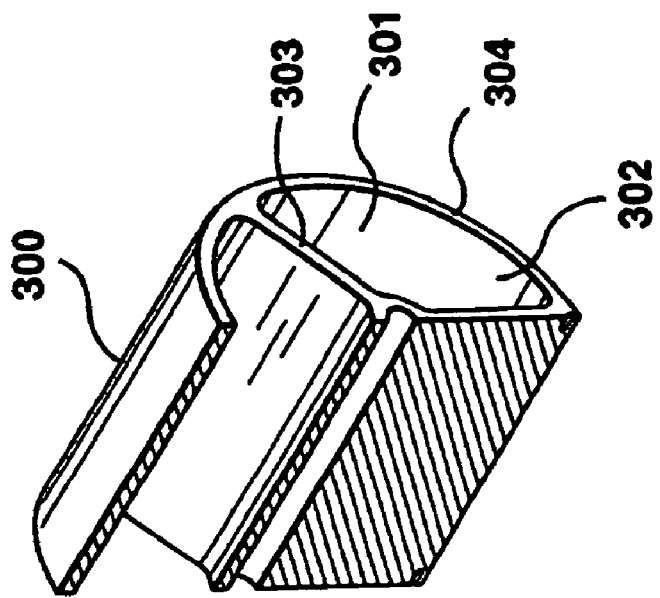
FIG. 7b shows a perspective sectional view of a first example of a multi-cavity media support according to the present invention.
Figure 7A:
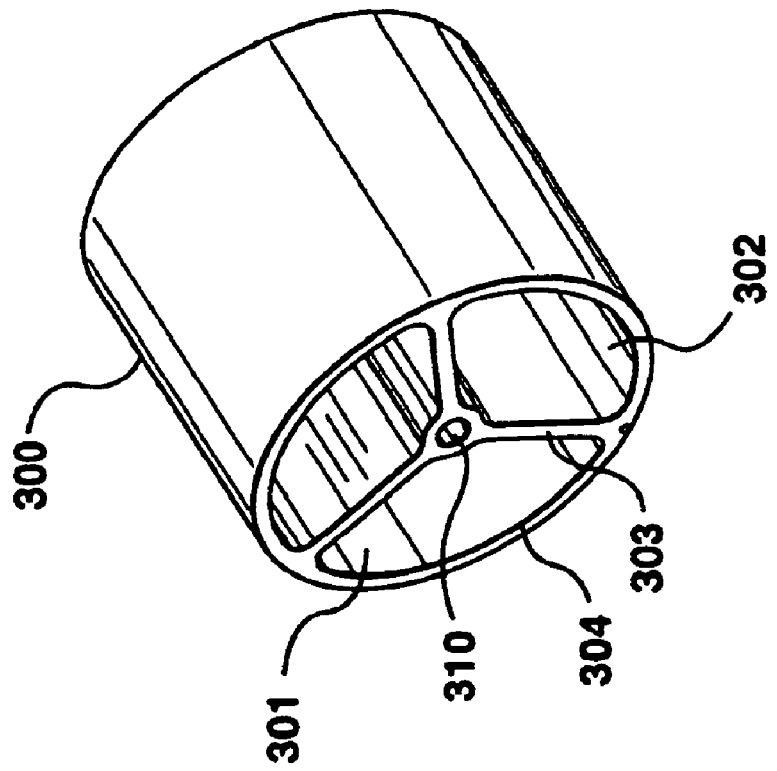
FIG. 7a shows a perspective view of a first example of a multi-cavity media support according to the present invention.
Figure 8A:
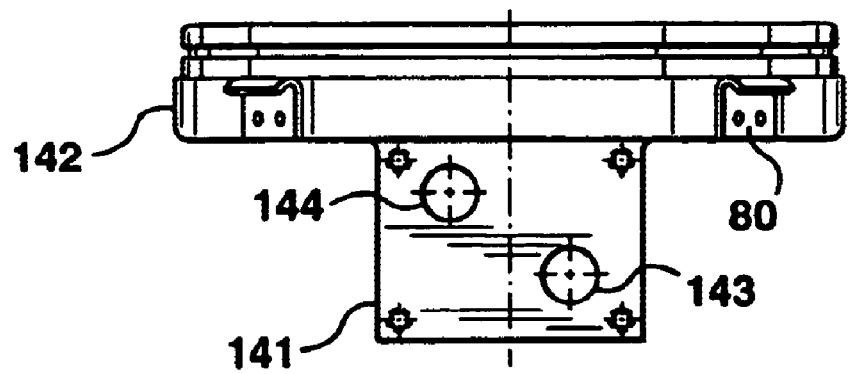
FIG. 8a shows a perspective view of a end housing according to the present invention with snap connection means provided thereon.
Figure 8B:
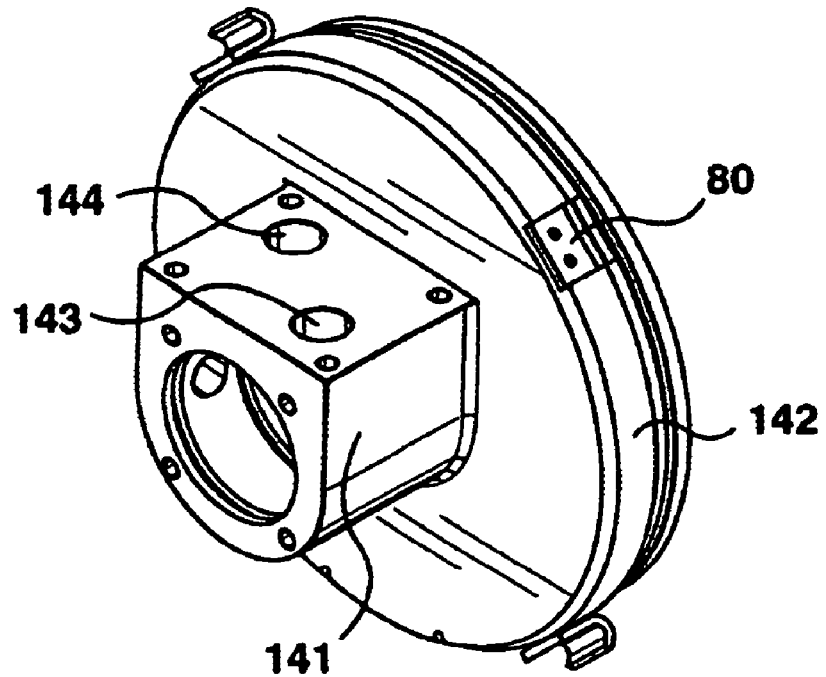
FIG. 8b shows another perspective view of a end housing according to the present invention with snap connection means provided thereon.

As described above, the exchange media 110 typically has a multitude of parallel fluid channels. When operating with fluid streams having higher pressures and/or high-pressure gradients, the fluid stream that has a higher pressure tends to crossover the axially extending channels of the media 110 towards the fluid stream having a lower pressure. This can result in poor humidity and/or heat exchange, and even leakage of the enthalpy wheel assembly 100. Therefore, the enthalpy wheel assembly 100 of the present invention preferably has a multi-cavity media support 300, as shown in FIGS. 7a and 7b. The multi-cavity media support 300 has an inner wall 302 and is generally cylindrical in shape, as the central housing 120, but with a smaller diameter. The multi-cavity media support 300 has a hub 310 for the shaft 180 to pass through. A plurality of cavity dividers 303 extend radially from the hub 310 towards the inner wall 302 of the multi-cavity media support 300 and axially throughout the length thereof, thereby dividing the inner space thereof into a plurality of cavities 301, corresponding to the number of the chambers 150. Moreover, the multi-cavity media support 300 has an end face 304.

In operation, the multi-cavity media support 300 is fitted into the central housing 120, and the media is then separately placed into the plurality of cavities 301. Therefore, the media in one cavity 301 is isolated from those in adjacent cavities. Each chamber 150, 150' within the first and second end housings 140 and 140' is respectively aligned with a corresponding cavity 301 within the multi-cavity media support 300. Since the end housings 140, 140' and the multi-cavity media support 300 do not rotate, an appropriate conventional face sealing means, such as, for example, a gasket (not shown), may be utilized to provide sealing between the stationary end face 304 of the multi-cavity media support 300 and stationary end faces 159 and 159' of the first and second end housings 140 and 140' respectively. As a result, different gas stream paths are isolated from one another and stream leakage from higher-pressure streams to lower pressure streams across the media material is prevented by the isolating property of the multi-cavity media support 300 and the sealing technique mentioned above. Optionally, the material of the multi-cavity media support 300 may also be chosen to have a thermal insulation property, so that the stream paths are further thermally insulated from one another, and from the wall of the central housing 120 and thus the environment.

Now referring to FIGS. 8a, 8b, 9a and 9b, the central housing 120 and the first and second end housings 140 and 140' can be provided with snap connection means for easily disassembling the enthalpy wheel assembly 100. On the outer walls of the first and the second end housings 140 and 140', a plurality of attachments 80 are provided. On the outer wall of the central housing 120, a number of latches 70 and hooking means 60 are provided. The hooking means 60 can be configured to hook the attachments 80 to form a snap-on connection with the latches 70. The latches 70 can be gripped by hand to drive the hooking means 60 to hook the attachments 80. This forms a snap-on connection that enables the central housing 120 and the first and second end housings 140 and 140' to be connected and disconnected with ease. This arrangement simplifies the task of replacing the media.

The arrangement of FIG. 2a is intended to provide energy and/or mass exchange between two fluid streams. This is explained further, by the detailed descriptions of the different modes of operation described below.

For example, referring to FIG. 10, a first warm and humidified gas stream 10 and a second cool and dry gas stream 20 run concurrently through the enthalpy wheel assembly 100, that is, the gas streams 10, 20 enter through the same side of the wheel 100, and exit through the same side of the wheel 100. The first gas stream 10 enters the enthalpy wheel assembly 100 through gas port 143, and flows into the first inner space 440. From here, the first gas stream 10 flows through the plurality of gas dispersion holes 251 located on the second reduced diameter portion 250, into the inner bore 214 of the fluid stream diverter 200. Next, the first gas stream 10 flows along the length of the inner bore 214, and exits the fluid stream diverter 200 through slot 213. As the fluid stream diverter 200 is continuously rotating with the shaft 180, the first gas stream 10 flows into one of the chambers 150 via a respective opening 156 when the fluid stream diverter 200 rotates into a position where slot 213 fluidly communicates with one of the openings 156. As the gas streams are usually conveyed by means of blowers (not illustrated), the first gas stream 10 is forced to flow along the axial direction into the media 110 supported in one of the cavities 301 in the central housing 120. As previously mentioned, the media 110 in one of the cavities 301 has a plurality of axially extending channels that are not in communication with the plurality of axially extending channels in the other of the cavities in either the radial or circumferential directions. Therefore, the first gas stream 10 flows along the plurality of media channels to the corresponding chamber 150' of the second end housing 140'. From here, the first gas stream 10 flows through opening 156' and slot 213' respectively, and enters the inner bore 214' of the fluid stream diverter 200'. Next, the first gas stream 10 flows along the length of the inner bore 214', exits through the plurality of holes 251', passes through the first inner space 440', exits the enthalpy wheel assembly 100 through the gas port 143', and passes into an external duct (not shown). As the first gas stream 10 flows across the plurality of channels in the media 110, the heat and humidity of the first gas stream is retained in the media 110. Since the fluid stream diverter 200 continually rotates with the shaft 180, the first gas stream 10 flows through all the channels of the media 110 to retain heat and humidity.

A second gas stream 20 enters the enthalpy wheel assembly 100 through gas port 144, and flows into the second inner space 441. It is noted that the first inner space 440 is isolated from the second inner space 441. From here, the second gas stream 20 passes through slots 211 and 212 respectively. The second gas stream 20 then flows into one of the separate chambers 150 via a respective opening 156 when the fluid stream diverter 200 rotates into a position where slot 212 fluidly communicates with one of the openings 156. Next, the second gas stream 20 flows along the plurality of media channels in one of the cavities 301 of the central housing 120 to a corresponding chamber 150' of the second end housing 140'. As stated above, the humidity and heat of the first gas stream 10 is retained in all the channels of the media in all of the cavities 301 of the central housing 120. Therefore, as the second gas stream 20 flows along the channels heat and humidity is transferred to it. Hence, the second gas stream 20 is heated and humidified as it passes through the media 110 to chamber 150' of the second end housing 140'. From here, the second gas stream 20 flows through opening 156', slots 212' and 211' respectively, and enters the second inner space 441'. Next, the second gas stream 20 exits the enthalpy wheel assembly 100 through gas port 144', and passes into an external duct (not shown).

Figure 11:
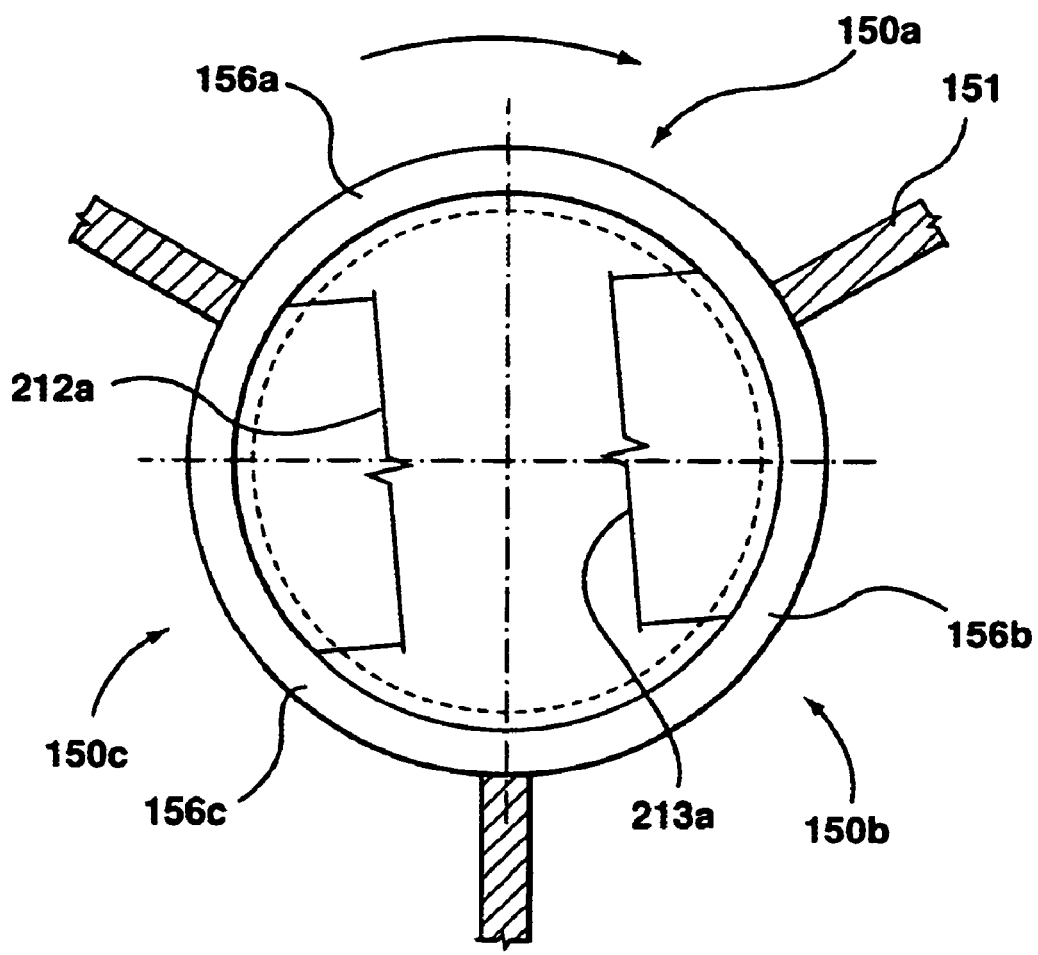
FIG. 11 shows a cross-sectional view taken along the line A—A of FIG. 2a, illustrating the relationship between the size of the slots in the fluid stream diverter and the openings in the end housing.

It is noted that at any time, any one of chambers 150, media cavities 301, and chambers 150', will only contain either gas from the first stream 10 or gas from the second stream 20. The chamber dividers 151 separate each chamber so that the first and second gas streams 10, 20 will never mix. To ensure no mixing of the gas streams, for the embodiment illustrated, the size of the slots 212, 213 of the fluid stream diverter 200 and the size of the openings 156 are selected and oriented as follows. FIG. 11 shows the relationship between the size of the slots 212, 213 and the three openings 156, in case of three chambers 150, and numbered in FIG. 11 as 156a, 156b, and 156c. In this Figure, segments 212a and 213a, respectively, indicate cords corresponding to the arc shaped slots 212 and 213. Therefore, the two ends of each segment 212a, 213a represent the two ends of each slot 212, 213, respectively. As illustrated in FIG. 11, the fluid stream diverter 200 is rotating in a clockwise direction. The slots 212, 213 and the openings 156 should be sized and oriented such that at the moment the slot 213 rotates away from chamber 150a, to cut off fluid communication between the slot 213 and the opening 156a, the slot 212 does not fluidly communicate with the same opening 156a. This arrangement will ensure the first and second fluid streams will not mix in each chamber 150.

Figure 12:
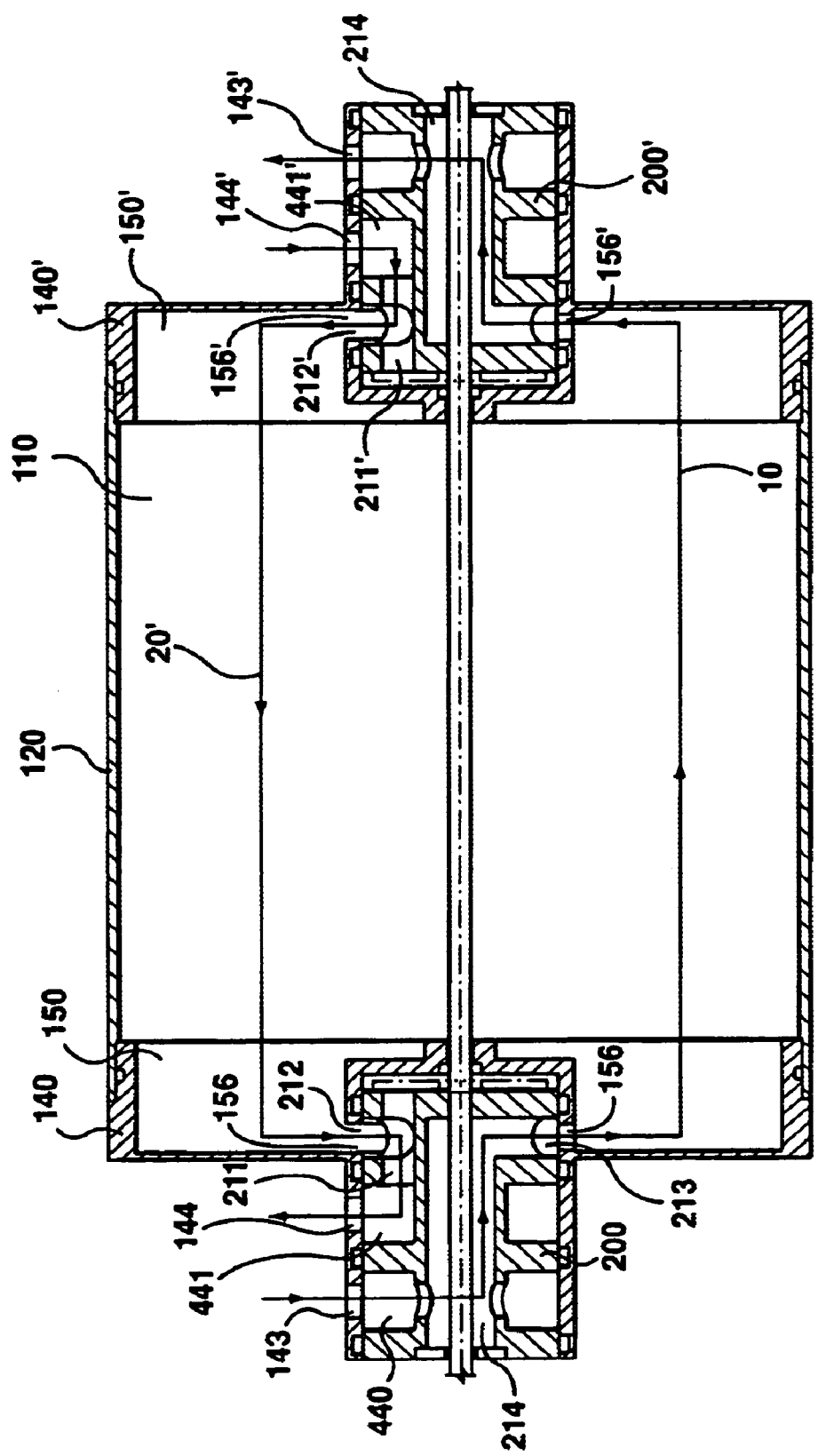
FIG. 12 shows another longitudinal sectional view of an enthalpy wheel assembly according to the present invention.

Now referring to FIG. 12, in a second embodiment, the gas streams 10, 20' run through the enthalpy wheel 100 counter-currently, that is, the first gas stream 10 enters the wheel 100 on one side, and the second gas stream 20' enters the wheel 100 on the opposite side. This is the preferred mode of operation. The first gas stream 10 follows the same gas flow path as the first embodiment described above and will not be repeated.

A second gas stream 20' enters the enthalpy wheel assembly 100 through gas port 144' of the second end housing 140', and flows into the second inner space 441'. From here, the second gas stream 20' passes through slots 211' and 212', respectively. The second gas stream 20' then flows into one of chambers 150' via a respective opening 156' when the fluid stream diverter 200' rotates into a position where slot 212' fluidly communicates with one of the openings 156'. Next, the second gas stream 20' flows along the plurality of media channels in one of the cavities 301 of the central housing 120 to a corresponding chamber 150 of the first end housing 140. As the second gas stream 20' flows along the channels heat and humidity is transferred to it as described above for the embodiment of FIG. 10. From here, the second gas stream 20 flows through opening 156, slots 212 and 211 respectively, and enters the second inner space 441 of the first end housing 140. Next, the second gas stream 20' exits the enthalpy wheel assembly 100 through gas port 144, and passes into an external duct (not shown).

Figure 13:
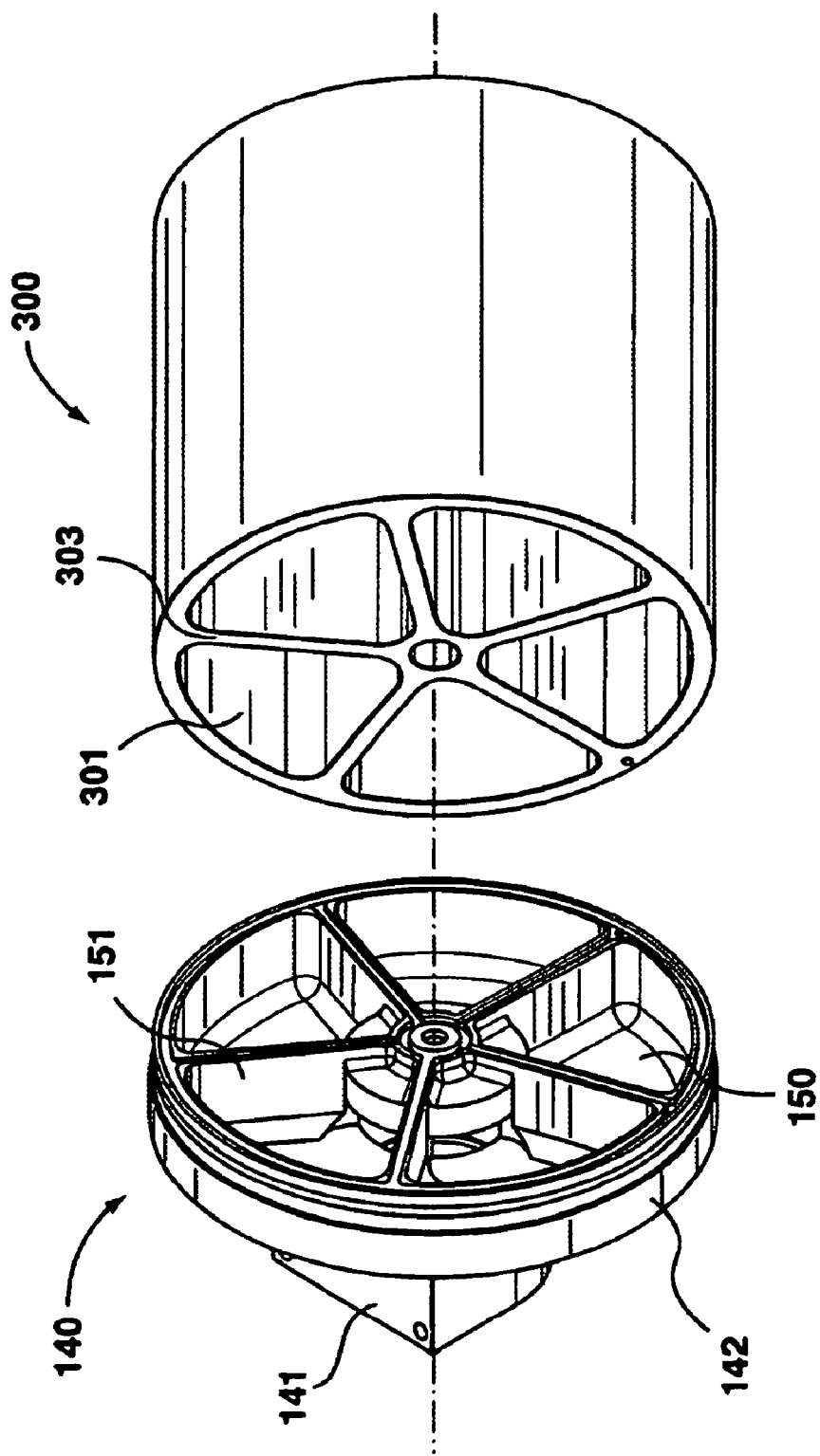
FIG. 13 shows a perspective view of a second example of an end housing and a multi-cavity media support according to the present invention.

FIG. 13 shows a perspective view of an end housing 140 and a multi-cavity support 300 according to a second example of the present invention. In this example, the end housing 140 has five chamber dividers 151 that section the dispersion portion 142 into five separate chambers 150. Likewise, the multi-cavity support 300 has five cavity dividers 303 that divide the inner space of the multi-cavity support 300 into five separate cavities 301 corresponding to the chambers 150 of the end housing 140. It is understood that the chambers 150 and the cavities 301 are in alignment during operation and that at any time, any one of chambers 150, media cavities 301, and chambers 150', will only contain either gas from the first stream 10 or gas from the second stream 20. The chamber dividers 151 separate each chamber so that the first and second gas streams 10, 20 will never mix. The size and orientation of the slots 212, 213 of the fluid stream diverter 200 and the size and orientation of the openings 156 are selected depending on the actual number of chambers 150 and to ensure no mixing of the gas streams.

It is also understood that although in the above embodiments, the central housing 120, the connection portions 141, 141', the dispersion portions 142, 142' of the end housings 140, 140', and the first, second and third segments 220, 240, 260 are all described as cylindrical in shape, the actual shape may vary as required. These components may have different perimetrical extents at different axial positions thereof. Therefore, the words "diameter" and "radial " as used in this disclosure do not limit the shape of the components.

The enthalpy wheel 100 can work in many different systems since it has the ability to operate in two different modes, that is concurrently and counter-currently. Moreover, the connections between the central housing 120 and the end housings 140, 140' are adapted for easy assembly and disassembly of the enthalpy wheel 100.

Additionally, since the central housing 120 and hence the media do not rotate during operation, the system can work with two or more gas streams having high pressure and/or high pressure gradients. By having the enthalpy wheel remain stationary during operation the system can be scaled up or down for use in novel applications. Moreover, since the rotary members have smaller diameters than conventional designs, the enthalpy wheel assembly of the present invention can require less driving force for rotation, reducing system energy loss and improving system efficiency.

While the above description constitutes the preferred embodiments, it will be appreciated that the present invention is susceptible to modifications and changes without departing from the fair meaning of the proper scope of the accompanying claims. For example, the exchange media can comprise any material that is well known in the art. Moreover, since the central housing 120 and the media 300 do not rotate during operation, the housings of the present invention are not limited to cylindrical shapes. The shapes of the housings 120, 140, 140' may include, but are not limited to, square, rectangular or triangular. Similarly, the fluid stream diverters 200 are not limited to the shape as disclosed herein.

We claim:

1. A regenerative energy and/or mass exchange assembly, comprising:
    a) an exchange media;
    b) a first chamber having a first fluid channel adjacent the exchange media to pass a first fluid stream through the exchange media;
    c) at least a second chamber having a second fluid channel adjacent the exchange media to pass a second fluid stream through the exchange media, the first and at least second chambers separated by a divider;
    d) at least one fluid stream diverter adjacent the exchange media, the at least one diverter having an adjustable orientation relative to the chambers and providing separate flow communications to the chambers through the respective fluid channels, the at least one fluid stream diverter having a radial extent that is less than the functional radial extent of the exchange media, this functional radial extent of the exchange media being defined by the fluid conducting area of the exchange media adjacent the fluid channels; and
    e) at least one housing connected to one end of the exchange media and the fluid channels being provided in the housing, wherein the at least one housing has interior walls defining an inner enclosure and a connection portion and a dispersion portion which are in fluid communication with each other, and the at least one fluid stream diverter is provided in the inner enclosure;
    and wherein, at any given diverter orientation, the separate flow communications are not in fluid communication with the same chamber;
    wherein the dispersion portion comprises the first and at least second chambers;
    wherein the exchange media is housed in a plurality of media cavities that are separated from one another in cross section and extend in parallel along the exchange media, and wherein the plurality of cavities that house the exchange media are disposed within a central housing, the assembly has a first end housing and a second end housing disposed on either end of the exchange media, and a first fluid stream diverter is disposed in the first end housing and a second fluid stream diverter is disposed within the second end housing.

2. An exchange assembly according to claim 1 wherein the fluid stream diverter is rotatably mounted within the inner enclosure to provide the diverter with the adjustable orientation.

3. An exchange assembly according to claim 2 further comprising a shaft that extends rotatably through the exchange media and the at least one housing connected to one end of the exchange media, and wherein the fluid stream diverter is fixed to the shaft.

4. An exchange assembly according to claim 1 wherein the connection portion has at least one port in flow communication with each respective fluid channel, each port adapted to connect to external fluid stream sources.

5. An exchange assembly according to claim 1 wherein the dispersion portion has an open end that is in fluid communication with the exchange media.

6. An exchange assembly according to claim 1 wherein the connection portion has a radial extent that is less than the radial extent of the dispersion portion.

7. An exchange assembly according to claim 1 wherein the inner enclosure is substantially disposed within the connection portion.

8. An exchange assembly according to claim 7 wherein the fluid stream diverter has a radial extent that is substantially equal to the radial extent of the inner enclosure.

9. An exchange assembly according to claim 1 wherein each cavity is thermally insulated from adjacent cavities.

10. An exchange assembly according to claim 1 wherein the plurality of media cavities are positioned in correspondence to the chambers of the dispersion portion.

11. An exchange assembly according to claim 1 wherein the connection portion has an open end and a closing means which closes the open end.

12. An exchange assembly according to claim 1 further comprising snap-connection means provided between the central housing and the housing connected to one end of the exchange media.

13. An exchange assembly according to claim 1 wherein the plurality of chambers of the dispersion portion of the first end housing is in substantial axial alignment with the corresponding plurality of chambers of the dispersion portion of the second end housing.

14. An exchange assembly according to claim 13 wherein the first and second fluid stream diverters are disposed correspondingly in the respective end housings and rotate in phase during operation.

15. A regenerative energy and/or mass exchange assembly, comprising:
    a) an exchange media housed in a plurality of cavities that are separated from one another in cross section and extend in parallel along the direction of fluid stream flow, the plurality of cavities being disposed in a central housing and each cavity being thermally insulated from adjacent cavities;
    b) a first flow path to pass a fluid stream through the exchange media;
    c) at least a second flow path to pass a further fluid stream through the exchange media;
    d) at least one housing connected to one end of the exchange media, the flow paths being provided in the housing;
    e) at least one fluid stream diverter that cooperates with the housing to form the flow paths, the at least one diverter having a radial extent that is generally less than the radial extent of the exchange media and being rotatably mounted within the housing to divert the different flow paths to pass the respective fluid streams through different cavities of the exchange media; and
    f) a shaft that extends through the exchange media, the at least one housing connected to one end of the exchange media, and the fluid stream diverter rotatably mounted within the housing;
    and wherein
    the at least one housing connected to one end of the exchange media comprises a connection portion and a dispersion portion which are in fluid communication with each other;
    the connection portion has at least two ports adapted to connect to external fluid stream sources and a radial extent that is generally less than the radial extent of the dispersion portion, the diverter being substantially disposed within the connection portion and having a radial extent that is substantially equal to the radial extent of an inner wall of the connection portion;
    the dispersion portion has an open end that is in fluid communication with the exchange media, the dispersion portion comprising a plurality of chambers that are separated from one another; and the plurality of cavities that house the exchange media are disposed within a central casing, each cavity being thermally insulated from adjacent cavities and being positioned in correspondence to the chambers of the dispersion portion, the cavities and the chambers being substantially equal in cross section and substantially evenly spaced about the axial direction, the quantity of cavities and chambers be equal to each other and equal to a quantity of one of the group consisting of three and five; and wherein the fluid stream diverter comprises in sequence along the axial direction a first segment, a first reduced diameter portion, a second segment, a second reduced diameter portion, and a third segment; an inner bore defining an inner space within the fluid stream diverter; a first passage extending from a first port in the outer wall of the second reduced diameter portion through the inner space and then to a second port on the outer wall of the first segment; a second passage extending from a third port on the end wall of the first segment adjacent to the first reduced diameter portion to a fourth port on the outer wall of the first segment; and wherein the said first and second passages are isolated from each other.

16. An exchange assembly according to claim 15 wherein sealing means is provided between the fluid stream diverter and the connection portion.

17. An exchange assembly according to claim 16 wherein sealing means is provided between each of the first, second, and third segment, of the fluid stream diverter and the inner wall of the connection portion.

18. An exchange assembly according to claim 17 wherein the connection portion has an open end and a closing means which closes the open end.

19. A regenerative energy and/or mass exchange assembly, comprising:
 a) an exchange media housed in a plurality of cavities that are separated from one another in cross section and extend in parallel along the direction of fluid stream flow;
 b) a first flow path to pass a fluid stream through the exchange media;
 c) at least a second flow path to pass a further fluid stream through the exchange media;
 d) at least one housing connected to one end of the exchange media, the flow paths being provided in the housing;
 e) at least one fluid stream diverter that cooperates with the housing to form the flow paths, the at least one diverter having a radial extent that is generally less than the radial extent of the exchange media and being rotatably mounted within the housing to divert the different flow paths to pass the respective fluid streams through different cavities of the exchange media; and
 f) a shaft that extends through the exchange media, the at least one housing connected to one end of the exchange media, and the fluid stream diverter rotatably mounted within the housing; and wherein the at least one housing connected to one end of the exchange media comprises a connection portion and a dispersion portion which are in fluid communication with each other;

the connection portion has at least two ports adapted to connect to external fluid stream sources and a radial extent that is generally less than the radial extent of the dispersion portion, the diverter being substantially disposed within the connection portion and having a radial extent that is substantially equal to the radial extent of an inner wall of the connection portion;

the dispersion portion has an open end that is in fluid communication with the exchange media, the dispersion portion comprising a plurality of chambers that are separated from one another;

the plurality of cavities that house the exchange media are disposed within a central housing; and the assembly further comprising snap-connection means provided between the central housing and the housing connected to one end of the exchange media.

20. A regenerative energy and/or mass exchange assembly, comprising:
 a) an exchange media having a casing;
 b) at least one housing attached to one end of the casing, the housing having:
  i) a dispersion end with a first and at least a second chamber adjacent the exchange media, the first and at least second chambers separated by a divider;
  ii) a connection end with first and at least second ports for connection to external fluid flows; and
  iii) an inner enclosure providing fluid communication between the chambers of the dispersion end and the ports of the connection end;
 c) a fluid stream diverter substantially disposed in the inner enclosure of the housing, the fluid stream diverter having an adjustable orientation within the housing and cooperating with the housing to form at least two separate movable fluid channels extending between the ports and the chambers, wherein the diverter is generally cylindrical in shape and wherein the at least two movable fluid channels comprise respective first and second annular grooves provided in the diverter and separated by an annular wall; and
 d) sealing means provided between the housing and the fluid stream diverter for preventing fluid cross-flow between the at least two movable fluid channels, the movable fluid channels providing separate flow communications between the ports and the chambers independent of the attachment of the housing to the casing, and wherein, at any given diverter orientation, the separate flow communications are not in fluid communication with the same chamber.

21. The exchange assembly of claim 20 wherein the sealing means comprises an o-ring disposed between the annular wall and an inner surface of the housing.

* * * * *